United States Patent [19]
Styron et al.

[11] 3,820,349
[45] June 28, 1974

[54] SLUDGE SEPARATION SYSTEM

[75] Inventors: James S. Styron, North Syracuse; Zolian Mandy, Camillus, both of N.Y.

[73] Assignee: Carrier Corporation, Syracuse, N.Y.

[22] Filed: May 1, 1973

[21] Appl. No.: 356,235

[52] U.S. Cl. ........................ 62/58, 62/159, 62/218, 62/324
[51] Int. Cl. ........................................... F25b 29/00
[58] Field of Search ....... 62/58, 159, 160, 196, 218, 62/324, 325

[56] References Cited
UNITED STATES PATENTS 3,759,055  9/1973  Shimanaki et al. .................... 62/160
3,777,508  12/1973  Imabayshi ............................. 62/324

*Primary Examiner*—Meyer Perlin
*Attorney, Agent, or Firm*—J. Raymond Curtin; D. Peter Hochberg

[57] ABSTRACT

A sludge separation system including a reversible refrigeration circuit having a set of sludge receiving heat exchangers which alternate between evaporating and condensing functions to periodically freeze and thaw sludge to effect the separation of solid constituents therein, and a compressor which operates only when the pressure differential of the refrigerant in the heat exchangers is insufficient to force the refrigerant from the evaporator to the condenser.

8 Claims, 1 Drawing Figure

PATENTED JUN 28 1974 3,820,349
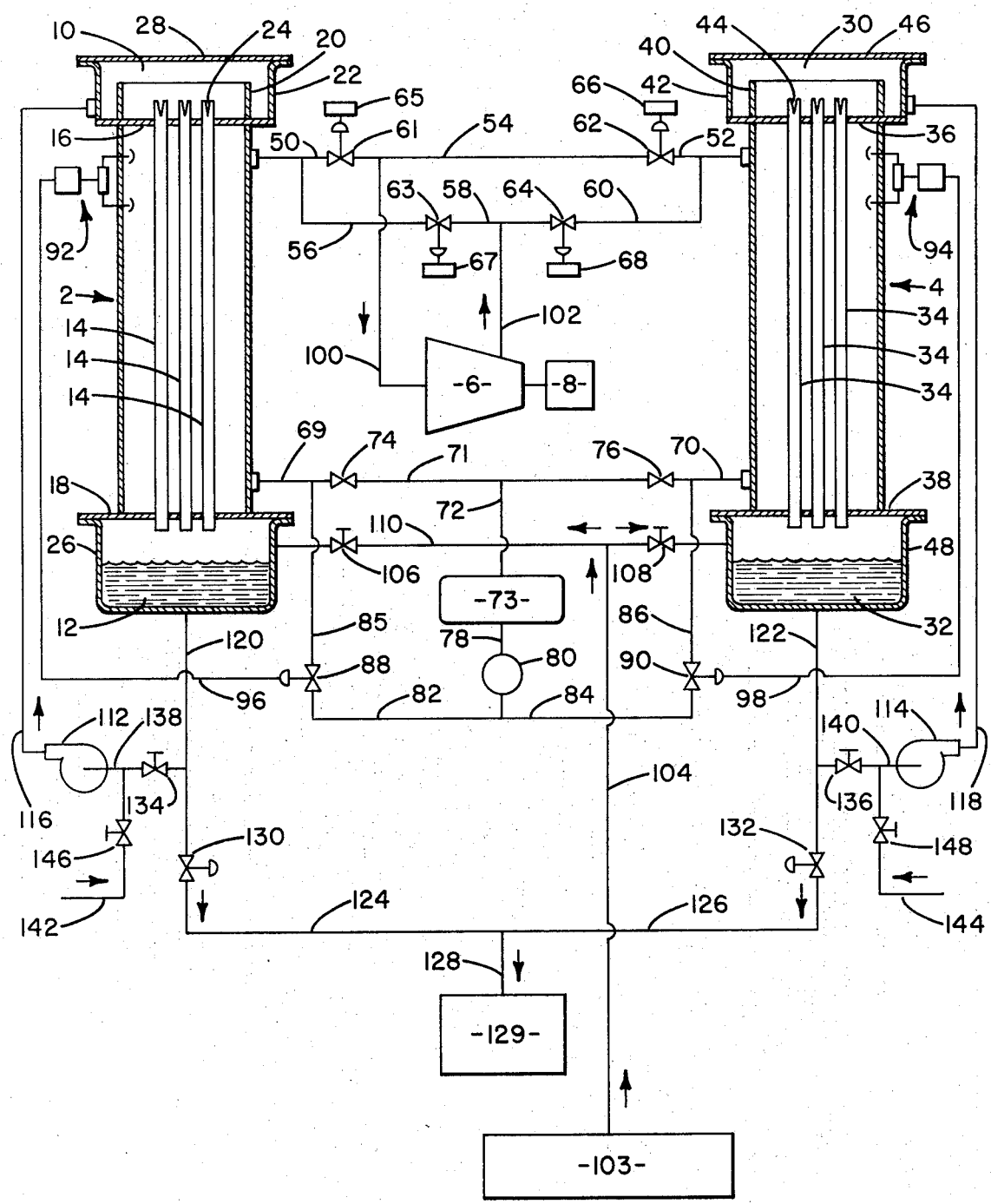

SLUDGE SEPARATION SYSTEM

BACKGROUND OF THE INVENTION

1. Field of the Invention

This invention relates to sludge processing systems and in particular to sludge processing systems which incorporate a refrigeration circuit for freezing and thawing sludge to effect the separation of the sludge into concentrated and dilute parts.

2. Description of the Prior Art

Various liquid treating processes, such as water purification and sewage treatment, produce as a waste product a gelatinous substance referred to as sludge. Sludges generally consist of colloidal particles suspended in a liquid vehicle. The disposal of raw sludge by dumping it in natural waters or using it as landfill has become highly objectionable because of environmental concerns, and there has been substantial interest in dewatering sludges and removing the solid materials therefrom. An example of sludge production is the method of rendering water potable which involves the deposition of aluminum salts in the water to precipitate matter suspended therein. The precipitate forms of alum sludge in substantial quantities which must be disposed of. A system for solving this disposal problem is taught by commonly assigned, copending U.S. patent application Ser. No. 231,274, now U.S. Pat. No. 3,745,782, which was filed on Mar. 2, 1972, in the name of Neyhart et al., and entitled "Sludge Separation Systems." That patent application discloses a reversible refrigeration system having a pair of falling film heat exchangers through which a refrigerant is circulated to cyclically freeze and thaw sludge fed to the heat exchangers. Upon thawing, the impurities in the concentrated sludge tend to settle out. Thus, freezing of sludge is a very advantageous means to effect the separation of solid constituents from the liquid medium.

The cited application goes on to describe the advantages which falling film heat exchangers provide to ice-producing refrigeration systems, both with regard to the increased rate of freezing and thawing, and the low mechanical strain on the apparatus. The heat exchangers in the above system each comprise appropriate shells having vertically disposed tubes adapted to receive raw sludge and to discharge thawing processed sludge, and the system has apparatus for circulating refrigerant through the exchangers so that each alternates between evaporating and condensing functions. Thus, while one heat exchanger serves as an evaporator and operates to freeze sludge in its sludge containing tubes, the other serves as a condenser and operates to thaw sludge frozen in its tubes during the previous cycle. When sufficient sludge in the evaporating heat exchanger is frozen, the system is reversed whereby the roles of the heat exchangers are accordingly switched.

The foregoing system employs a compressor to compress refrigerant vapor discharged from the evaporator. The power requirements of a refrigeration system of the foregoing type are substantial, and it is desirable to reduce such requirements if possible and economical.

One means for improving the efficiency of a refrigeration system is known in the art as "free cooling." Basically, free cooling involves the employment of a pressure differential in the refrigerant of the system to circulate the refrigerant therethrough, and to employ a compressor for this purpose only when this pressure differential is not sufficient to effect the task. Thus, free cooling greatly reduces the period during which the compressor is required, and likewise reduces the power requirements of the system. Heretofore, free cooling has not been employed in sludge separation or ice producing apparatus.

SUMMARY OF THE INVENTION

An object of the present invention is to improve the efficiency of sludge separation apparatus which incorporates a refrigeration system to freeze and then thaw sludge in order to separate the solid constituents therein from the liquid vehicle.

A further object is to provide an improved sludge separation system which incorporates a reversible refrigeration system to cyclically freeze and thaw sludge to effect the desired separation.

Still another object of the invention is to provide an efficient method of freezing and then thawing sludge to cause the solid constituents to separate therein.

Other objects will be apparent from the description to follow and from the appended claims.

The foregoing objects are achieved according to a preferred embodiment of the invention by the provision of a reversible refrigeration system including a pair of falling film heat exchangers which each alternate between condensing and evaporating functions, one serving as a condenser while the other serves as an evaporator or chiller. Raw sludge is fed into vertical heat exchange tubes comprising the exchangers to freeze in the exchanger acting as an evaporator while sludge previously frozen in the other exchanger thaws and drops to an appropriate receptical. Each phase of the refrigeration cycle has two stages, a first stage in which refrigerant circulates through the system while the compressor is shut down, and a second stage in which the compressor moves the refrigerant in its appropriate direction. The cycle switches its direction when a sufficient amount of sludge in the tubes of the evaporating heat exchanger has frozen and the sludge in the tubes of the other heat exchanger has melted.

BRIEF DESCRIPTION OF THE DRAWINGS

The drawing is a schematic representation of a sludge separation system according to the present invention.

DESCRIPTION OF THE PREFERRED EMBODIMENT

The preferred embodiment of the invention described below incorporates a pair of substantially identical falling film heat exchangers in a reversible refrigeration system. Refrigerant flows between the heat exchangers first in one direction so that one exchanger becomes a condenser while the other serves as an evaporator, and then in the reverse direction so that the roles of the heat exchangers switch. In each phase of the cycle, there is a stage during which a pressure differential drives refrigerant vapor from the evaporator to the condenser without the use of a compressor, and a second stage during which the pressures of refrigerant in the condenser and evaporator are in substantial equilibrium, and in which the compressor is activated to circulate the refrigerant vapor between the evaporator and the compressor. During operation of the system, sludge is frozen in the heat exchanger serving as an evaporator while sludge previously frozen in the other heat exchanger is thawed and discharged therefrom. The heat exchangers incorporate tubes for holding the sludge, and the refrigeration cycle is reversed when the reheat exchanger tubes of the evaporator are sufficiently filled with ice and the heat exchange tubes of the condenser have discharged their contents.

Referring to the drawing, the illustrated sludge separation apparatus includes a first heat exchanger 2, a second heat exchanger 4 and a refrigerant compressor 6 driven by a motor 8. First heat exchanger 2 is provided with an upper header 10 and a lower header 12 communicating with the open ends of a plurality of vertically disposed heat exchange tubes 14 secured in an upper tube sheet 16 and a lower tube sheet 18. An annular distributor 20 having a plurality of openings therein is radially inwardly spaced from a cylindrical outer shell 22 of the upper header for supplying liquid to the upper ends of heat exchange tubes 14. Heat exchange tubes 14 may be provided with a plurality of V-notches 24 or other means for promoting uniform flow of liquid from the liquid distributor into the interior of the heat exchange tubes.

A bottom shell 26 forms the lower header which comprises a sludge tank in cooperation with lower tube sheet 18. While it is necessary for the interior or shell side of heat exchanger 2 to be sealed from communication with the atmosphere, it is not necessary that upper and lower headers 10 and 12 be completely sealed. It is preferred to provide a removable cover plate 28 to enclose upper header 10, and similarly bottom shell 26 may be bolted to tube sheet 18 to make it easily removable for cleaning.

Heat exchanger 4 is identical in construction to heat exchanger 2 and comprises an upper header 30, a lower header 32 both communicating with a plurality of heat exchange tubes 34 which are secured to an upper tube sheet 36 and a lower tube sheet 38. An annular distributor plate 40 having apertures therein, is centrally disposed in outer shell 42 for distributing unfrozen sludge to the open upper ends of heat exchange tubes 34, which are provided with V-notches 44. A cover plate 46 is provided to close upper header 30 and a bottom shell 48 is provided to form lower header 32.

Heat exchangers 2 and 4 are part of a reversible refrigeration system in which R–12 or other suitable refrigerant circulates with compressor 6 and motor 8 shutdown, so long as a pressure differential exists which is sufficient to effect the transfer or refrigerant vapor from the evaporator to the condenser. Thus, lines 50 and 52 which extend from the heat exchangers are connected by refrigerant line 54 and by lines 56, 58 and 60. Flow through line 54 is controlled by valves 61 and 62, and flow through lines 56, 58, and 60 is controlled by valves 63 and 64. The operation of these valves can be controlled in many ways, such as by one or more differential pressure switches, sludge temperature switches, or manually. In the illustrated system, valves 61–64 are operated by differential pressure switches 65, 66, 67 and 68, respectively, which are responsive to the difference in the refrigerant pressures in the two exchangers. When valves 61, 62, 63 and 64 are open, heat exchangers 2 and 4 are in direct communication, and refrigerant vapor can pass from one exchanger to the other.

Similarly, heat exchangers 2 and 4 are connected by lines which transport condensed refrigerant from one heat exchanger to the other. Lines 69 and 70 lead from heat exchangers 2 and 4, respectively, and these lines are connected to a line 71 from which a line 72 leads to a receiver 73. Refrigerant flow through lines 69 and 70 is controlled by valves 74 and 76, respectively. Refrigerant is pumped from receiver 73 through a line 78 by a refrigerant pump 80 to either line 82 or line 84, which lead to lines 69 and 70, respectively, via lines 85 and 86. Flow through the latter lines is controlled by pneumatically controlled valves 88 and 90, respectively which are in turn operated by level controls 92 and 94 at the top of respective heat exchangers 2 and 4. Level controls 92 and 94 are connected to the valves they control by pneumatic connections 96 and 98. During operation, one of valves 74 and 76 is open while the other is closed, to permit refrigerant to flow from one heat exchanger to receiver 73, from whence it is pumped through pump 80 to the other heat exchanger. Condensed refrigerant flow can also be effected between the exchangers through the flow path defined by lines 69, 85, 82, 84, 86 and 70, which can be opened or closed through operation of valves 88 and 90, or through lines 69, 71 and 70 when valves 74 and 76 are open.

When refrigerant vapor is not forced from one heat exchanger to the other by virtue of a pressure differential in the refrigerant, compressor 6 is operated to withdraw refrigerant vapor from one heat exchanger for delivery to the other. For this purpose, line 100 leads from line 54 to the compressor, and line 102 leads from the compressor to line 58. Flow through line 54 is controlled by valves 61 and 62.

Raw sludge from a raw sludge tank 103 enters the system at inlet 104, and depending on which of valves 106 and 108 is open, passes through line 110 into lower header 12 or 32. Pumps 112 and 114 pump sludge from the lower headers through lines 116 and 118 to the respective upper headers. Processed sludge is discharged from the lower headers through lines 120 and 122 which join lines 124 and 126 leading to outlet 128 which delivers the material to a melted sludge tank 129. Flow through lines 120 and 122 is controlled by valves 130 and 132 respectively. Processed sludge can be recirculated through the exchangers or bypassed from the discharge lines through valves 134 and 136, into respective lines 138 and 140.

The various valves and pumps in the illustrated system can be manually operated in coordination with each other so that the system is in continuous operation, and except in the instances noted earlier, more sophisticated valve controls are omitted here for the sake of clarity. However, reference is made to commonly assigned copending application U.S. Ser. No. 356,276, entitled "Method and Apparatus for Concentrating Sludge," which was filed on even date herewith in the name of "Raineri et al., for a description of control apparatus contemplated for incorporation in sludge treatment systems of this type.

The foregoing system is reversible, and its operation will be considered at the end of a portion of its cycle in which heat exchanger 2 has been evaporating refrigerant and the refrigerant vapors have been discharged to heat exchanger 4 for condensation. Assuming the system has been proceeding through its normal operating cycle, heat exchange tubes 14 in exchanger 2 are substantially filled with frozen sludge and tubes 34 are empty, having discharged melting sludge to lower header 32. Valves 61 and 64 are open, valves 62 and 63 are closed, and compressor 6 is running; valves 76 and 88 are open; valve 134 is open and pump 116 is running; and all other valves are closed and other pumps are shut down. The direction of refrigerant flow and the functions of the heat exchangers are about to be reversed. Melted sludge is now drained from lower header 32 of heat exchanger 4 through valve 132 and admitted to melted sludge tank 129 serving as a settling tank; then a new charge of raw sludge is introduced from raw sludge tank 103 to lower header 32 through valve 108.

At this time, switches 66 and 67 open valves 62 and 63 in response to pressure differential in heat exchangers 2 and 4, and valves 61 and 64 are maintained in their open condition. Compressor motor 8 is turned off. Valves 76 and 88 are closed and valve 74 is opened to drain condensed refrigerant from heat exchanger 2 into receiver 73; pump 80 is actuated, and level control 94 generates a signal in response to the low level of refrigerant in heat exchanger 4 to effect the opening of valve 90. Sludge pump 116 is deactivated and valve 134 is closed, while sludge pump 114 is turned on and valve 136 is opened to circulate sludge through heat exchanger 4. The sludge is metered and distributed by distributor plate 40 so that it flows into the upper ends of tubes 34 and flows downwardly in a relatively thin film along the interior surfaces of the tubes. Refrigerant evaporating at the exterior surface of heat exchange tubes 34 causes a portion of the sludge to freeze as a cylindrical tube on the interior surface of tubes 34. Unfrozen sludge drains through line 22 and is recirculated through pump 114.

Raw liquid sludge circulating through tubes 34 has a temperature of approximately 70°F–80°F, and it acts to evaporate the liquid refrigerant in heat exchanger 4. The vaporizing R–12 refrigerant attains an approximate pressure of 90 psia under these conditions, and it is driven through generally parallel lines 52, 54, 50 and 52, 60, 58, 56 and 50 into heat exchanger 2. The frozen sludge in tubes 14 could be expected to have an initial temperature of 25°F, so that heat is absorbed from the incoming refrigerant vapor. This transfer of heat causes the vapor to condense on the outer walls of tubes 14 and on the inner wall of shell 20 at an approximate temperature of 28°F and at an approximate condensing pressure of 41 psia. The pressure differential between the heat exchangers is thus 49 psia, which is sufficient to drive vapor to heat exchanger 2 at a high rate of flow.

As the foregoing refrigerant flow progresses, the temperature of the sludge in tubes 34 of heat exchanger 4 drops rapidly along with an according pressure drop of the refrigerant inside heat exchanger 4. Similarly, the temperature inside tubes 14 of heat exchanger 2 rises by virtue of the heat transferred from the condensing refrigerant, and when the tube temperature reaches 32°F, the frozen sludge begins to melt. When the cylinders of melting sludge drop into lower header 12 below heat exchanger 2, pump 112 is actuated and valve 134 is opened, whereby melted sludge is recirculated through the heat exchanger.

Shortly after the commencement of this phase of the refrigeration cycle, the temperature of sludge inside tubes 34 of heat exchanger 4 drops to about 40°F, and the temperature of the evaporating vapor drops to about 35°F with a pressure of about 47 psia. Since the pressure of the condensing refrigerant in heat exchanger 2 remains fairly constant, it is apparent that in a brief time the refrigerant pressures in the two heat exchangers become equal. At this point it is necessary to start compressor motor 8 to operate compressor 6, in order to continue circulation of the refrigerant.

At the same time that compressor 6 is actuated, valves 61 and 64 are closed by virtue of the operation of switches 65 and 68; valve 62 is kept open to permit the passage of refrigerant vapor from heat exchanger 4 to enter compressor 6, and valve 63 is open to feed hot compressor discharge gas from compressor 6 into heat exchanger 2. Valves 74 and 90 also remain open to pass condensed refrigerant from heat exchanger 2 into heat exchanger 4. This second stage of the present phase of the refrigeration cycle continues with compressor 6 feeding the pressurized refrigerant vapor received from the heat exchanger which has been acting as an evaporator into the other heat exchanger which is acting as a condenser. When substantially all of the sludge in tubes 34 in the evaporating heat exchanger 4 has frozen, compressor 6 and pump 114 are turned off, valve 136 is closed; valve 130 is opened to drain melted sludge from lower header 12; and the cycle is reversed.

A charge of raw sludge is delivered through valve 106 to lower header 12 after closing valve 130. As the cycle proceeds, heat exchanger 2 now acts as an evaporator and heat exchanger 4 acts as a condenser, and the sludge previously frozen in the tubes 34 drops into lower header 32 while sludge fed into tubes 14 is frozen. During the first stage of the reversed phase of the cycle, valves 61, 62, 63, 64, 76 and 88 are open, while the other valves of the refrigeration system are closed. Likewise, sludge line valve 134 is open and pump 112 is running to circulate sludge through heat exchanger 2. At the termination of the first stage of the new cycle, compressor 6 is again actuated, and valves 62 and 63 are closed.

After the sludge is completely melted from heat exchange tubes 34, compressor 6 and pump 114 are stopped; valve 136 is closed; and valve 132 is opened. The now liquid, previously frozen, sludge passes through valve 132 and sludge passages 126 and 128 to melted sludge tank 129 to permit the rapid separation of suspended solid matter from the liquid vehicle. The next cycle reversal then occurs.

Additional cooling medium in the form of sludge, or preferably the separated liquid constituent thereof, may be supplied from a suitable location, such as a settling tank for previously frozen sludge, to the system through passages 142 or 144 and valves 146 or 148 in order to provide a cooling medium having additional cooling capacity to the condenser or to provide the entire cooling medium in the event that frozen sludge is not available or desired in the heat exchange tubes.

The apparatus according to the present invention enjoys those features which were set forth in previously cited U.S. Pat. application Ser. No. 231,274 filed Mar. 2, 1972. Various modifications suggested therein can also be adapted to the present invention. Moreover, it can be seen that the objects set forth earlier have been fully achieved by the invention. The incorporation of the apparatus for enabling the transfer of refrigerant vapor using thermal thaw stages in the refrigeration cycle can be expected to provide a 25 to 30 percent reduction in the total operating electric power requirements over the similar system in which the compressor is the exclusive means by which refrigerant vapors are transferred from one heat exchanger to the other. The efficiency of the system is therefore significantly improved, and the cost and complexity of the apparatus is substantially reduced.

The invention has been described in detail with particular reference to a preferred embodiment thereof, but it will be understood that variations and modifications can be effected within the spirit and scope of the invention.

We claim:

1. Apparatus for separating solid constituents from raw sludge, said apparatus comprising:
   A. first and second heat exchangers, each heat exchanger comprising:
      i. means for holding a circulating refrigerant in heat exchange relationship with sludge in the heat exchanger, said means including an inlet for receiving refrigerant and an outlet for discharging refrigerant, the refrigerant holding means in said heat exchangers serving opposite and alternating functions as condensers and as evaporators; and
      ii. means for holding sludge in heat exchange relationship with the refrigerant in the heat exchanger to facilitate the alternate freezing and melting of the sludge, said means including means for receiving raw sludge and means for discharging processed sludge; and
   B. means for circulating refrigerant through a reversible refrigeration cycle to alternately freeze and melt sludge in said heat exchangers, said circulating means comprising:
      i. compressor means for compressing refrigerant vapor received from one heat exchanger and for discharging compressed refrigerant to the other heat exchanger;
      ii. means for transferring refrigerant vapor from the heat exchanger acting as an evaporator to the heat exchanger acting as a condenser, said refrigerant transferring means including means for delivering refrigerant to said compressor means when the pressure differential between the refrigerant in said heat exchangers is insufficient to maintain a satisfactory refrigerant flow rate, and means for bypassing said compressor means when said pressure differential is sufficient to maintain said refrigeration flow rate;
      iii. means for transferring condensed refrigerant from the heat exchanger acting as a condenser to the heat exchanger acting as an evaporator; and
      iv. means for reversing the direction of flow of the refrigerant when the frozen sludge in the heat exchanger acting as a condenser has thawed sufficiently and the sludge in the heat exchanger acting as an evaporator has frozen sufficiently.

2. Apparatus according to claim 1 wherein said sludge holding means comprise falling film heat exchange members.

3. Apparatus according to claim 2 wherein said falling film heat exchange members comprise a set of generally vertical tubes in each heat exchanger for alternately receiving raw sludge and transmitting heat to the refrigerant in the heat exchanger to effect the freezing of sludge in the tubes, and for transmitting heat from the refrigerant in the heat exchanger to sludge in the tubes to effect the melting and discharge of sludge from the tubes.

4. Apparatus according to claim 1 and further including means for receiving melting sludge discharged from said sludge holding means.

5. Apparatus according to claim 1 and further including means for delivering raw sludge to said heat exchangers to replace sludge discharged from said apparatus.

6. Apparatus according to claim 5 wherein and further including means for pumping raw sludge to said sludge holding means.

7. Apparatus according to claim 6 and further including means for receiving sludge from said pumping means and for containing a supply of sludge for delivery to said sludge holding means; and means for actuating said pumping means when the level of sludge in said sludge containing means falls below a predetermined level.

8. The method of separating solid constituent from raw sludge in a sludge treatment system including first and second heat exchangers adapted to hold sludge and refrigerant in heat exchange relationship, a compressor connected to the heat exchangers, and refrigerant flow lines connecting the heat exchangers and the compressor in a refrigeration circuit, said method comprising:

effecting the flow of refrigerant through the first heat exchanger to cause the transfer of heat to the refrigerant from sludge in said first heat exchanger to evaporate the refrigerant;

effecting the flow of refrigerant vapor from said first heat exchanger to the second heat exchanger while bypassing the compressor when the pressure differential in the refrigerant is sufficient to urge it to the second heat exchanger; and effecting the flow of refrigerant vapor from said first heat exchanger to the compressor, compressing the refrigerant, and transferring the compressed refrigerant to the second heat exchanger when there is an insufficient pressure differential in the refrigerant urging it to the second heat exchanger at a desired rate;

effecting the flow of refrigerant vapor through said second heat exchanger to cause the transfer of heat from said refrigerant vapor to sludge in said second heat exchanger to condense the refrigerant;

effecting the flow of refrigerant condensate from said second heat exchanger to said first heat exchanger;

reversing the direction of flow of the refrigerant and thereby reversing the roles of said heat exchangers in response to the freezing of the sludge in the first heat exchanger and the melting of the sludge in the second heat exchanger;

introducing a quantity of raw sludge into the heat exchanger serving as a refrigerant evaporator and maintaining the sludge in a heat exchange relationship with the refrigerant in said heat exchanger to cause the sludge to freeze; and removing melting sludge previously frozen in the heat exchanger serving as a refrigerant condenser.

* * * * *